Oct. 14, 1969    K. HURST    3,472,438
APPARATUS FOR TRANSPORTING TAPE
Filed Nov. 3, 1967

INVENTOR:
Kurt HURST by
Michael S. Striker his ATTORNEY

United States Patent Office 3,472,438
Patented Oct. 14, 1969

3,472,438
APPARATUS FOR TRANSPORTING TAPE
Kurt Hurst, Stuttgart-Feuerbach, Germany, assignor to Robert Bosch G.m.b.H., Stuttgart Unterturkheim, Germany
Filed Nov. 3, 1967, Ser. No. 680,565
Claims priority, application Germany, Nov. 9, 1966, B 89,738
Int. Cl. B65h *17/22*
U.S. Cl. 226—176
8 Claims

ABSTRACT OF THE DISCLOSURE

Apparatus for intermittently transporting tape past a recording station which stores intelligence on the tape, preferably by destroying portions of a metallic layer at one side of the tape. The apparatus comprises a driven roller whose peripheral surface engages the tape, a weak leaf spring which bears against the one side of the tape and biases the other side of the tape against the peripheral surface of the roller so that the tape normally advances lengthwise in response to rotation of the roller, and disengaging means comprising a two-armed lever pivotable from an idle position to an operative position whereby one of its arms leaves a circumferential groove in the peripheral surface of the roller and urges the tape against the leaf spring so that the tape is clamped between the lever and the spring and ceases to advance in response to rotation of the roller. At the same time, the one arm of the lever reduces the area of contact between the roller and the tape. The other arm of the lever carries a moving coil adjacent to a stationary permanent magnet. When the coil is energized, it is attracted by the magnet and causes the one arm of the lever to clamp the tape against the spring.

BACKGROUND OF THE INVENTION

The present invention relates to apparatus for transporting tape, particularly for transporting tape-like carriers of coded or imprinted information.

In many types of recording apparatus, such as coding apparatus, telegraphic apparatus, rapid printers, switching relays and the like, the tape is transported past a recording device and is provided with intelligence. As a rule, the tape is formed with perforations and is transported by means of one or more sprocket wheels. In certain recent types of recording apparatus utilizing tape having a coat of metallic material which is destroyed or burned away at the recording station so that the thus destroyed portions of the metallic coat constitute the intelligence which is stored on the tape, the tape must be transported at a speed in the range of 5–10 meters per second or even more. Such transport cannot be effected by sprocket wheels because the teeth of sprocket wheels are likely to damage or destroy the tape along the perforations. Also, the inertia of sprocket wheels is too high so that such drives cannot be accelerated and/or decelerated within required short intervals of time. In many instances, the spacing between successive burned portions of the metallic coat is in the range of one-tenth of an inch; therefore, a satisfactory transporting apparatus must arrest the tape between successive increments which are provided with intelligence.

Certain presently known transporting apparatus for tape which is provided with a metallic coat utilize the so-called Johnsen-Rehbeck effect, i.e., a potential is built up between the metallic coat and one of the supports. It was found that such transporting apparatus cannot provide short braking distances in the range of one-tenth of an inch when the speed of the tape equals or exceeds five meters per second.

SUMMARY OF THE INVENTION

It is an object of the present invention to provide a novel and improved transporting apparatus for tape which can transport the tape at a speed in the range of at least five meters per second, which treats the tape gently, and which can arrest and accelerate the tape within extremely short intervals of time.

Another object of the invention is to provide the transporting apparatus with a novel device which can rapidly establish or terminate a motion transmitting connection between a simple drive and the tape.

A further object of the invention is to provide a transporting apparatus which can reduce the speed of the tape from the speed of up to and in excess of ten meters per second to zero within such short intervals of time that the distance covered by the tape during deceleration is less than or at most equals one-tenth of an inch.

An additional object of the invention is to provide the transporting apparatus with a simple drive which moves the tape lengthwise and which need not be decelerated when it becomes necessary to arrest the tape.

A concomitant object of the invention is to provide a transporting apparatus for tape which can be installed in many presently known recording apparatus serving to store intelligence on a tape which is coated with a metallic layer.

The improved transporting apparatus comprises a driven roller which can be coupled to the output shaft of a motor or the like and has a tape-engaging peripheral surface preferably provided on an elastic portion of the roller, resilient means engaging one side of the tape to bias the other side against the peripheral surface of the roller whereby the tape normally moves lengthwise in response to rotation of the roller, and disengaging means comprising a lifting member movable from an idle position to an operative position in which it displaces the tape with reference to the roller to reduce the area of contact between the tape and the peripheral surface so that the roller can rotate with reference to the tape.

The arrangement is preferably such that the lifting member can engage the tape opposite the resilient means so that the tape is then clamped between the lifting member and the resilient means and is thus held against lengthwise movement in response to continued rotation of the roller. The resilient means can include one or more leaf springs and the lifting member preferably comprises a two-armed lever one arm of which normally extends into a circumferential groove in the peripheral surface of the roller and is expelled from such groove to clamp the tape in response to energization of a moving coil which is mounted on the other arm of the lever.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
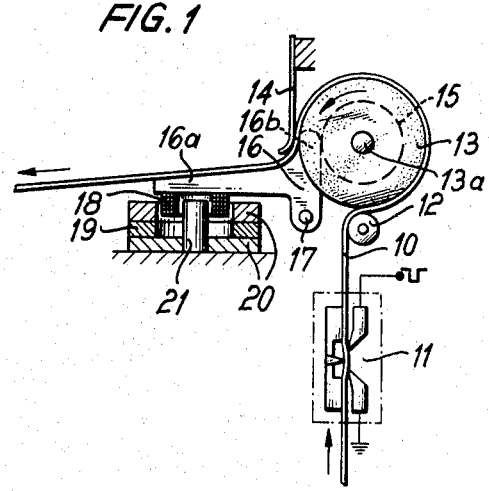
FIG. 1 is a partly elevational and partly vertical sectional view of a transporting apparatus which embodies my invention, the lifting member of the disengaging means being shown in idle position.

Referring to FIG. 1, the tape is shown at 10. The path of this tape extends along a recording device 11 comprising a pair of electrodes which can be heated to effect localized destruction of a layer of metal at the right-hand side of the tape. In this way, the recording device 11 stores information on the tape. The transporting apparatus comprises a roller 13 which is driven by the output shaft 13a of a motor or the like. The tape 10 forms a loop which extends around the peripheral surface of the roller 13 along an arc of more than 180 degrees, preferably about 270 degrees. This loop is formed on the one hand by a guide roll 12 which is located immediately upstream of the roller 13 and by a weak resilient element here shown as a leaf spring 14 which bears against one side of the tape 10 to bias the other side against the peripheral surface of the roller. At least a portion of the roller 13 preferably consists of rubber or similar elastic material and the peripheral surface of this roller is provided on such elastic material. This peripheral surface is formed with two axially spaced circumferential grooves 15 best shown in FIG. 2.

Figure 2:
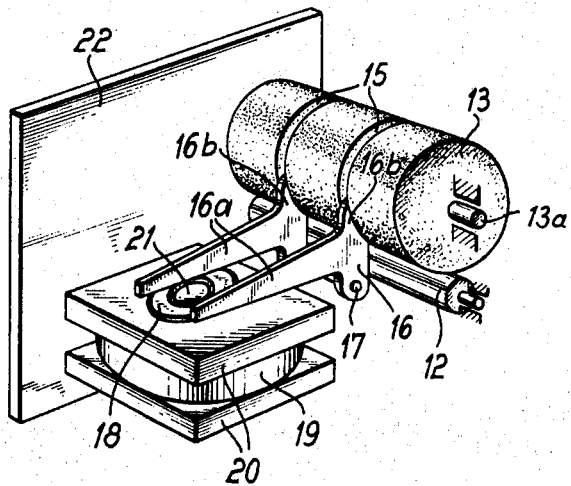
FIG. 2 is a perspective view of the transporting apparatus with the tape and recording device omitted, the lifting member being shown in operative position.

The disengaging means of the transporting apparatus comprises a lifting member in the form of a two armed lever 16 turnable about a fixed pivot pin 17 which is parallel with the shaft 13a. FIG. 2 shows that the lever 16 is actually composed of two parallel levers connected to each other by the pivot pin 17. The shorter arms 16b of the lever 16 normally extend into the grooves 15 and its longer arms 16a carry a moving coil 18 which is connected into a suitable electric circuit, not shown. The lever 16 preferably consists of lightweight synthetic plastic material and its mass is small so that it can be pivoted between the idle position of FIG. 1 and the operative position of FIG. 2 practically without any delay. The moving coil 18 is of lightweight design so that it adds only negligibly to the inertia of the lever 16. This moving coil forms part of a rocking unit which further includes a stationary ring-shaped permanent magnet 19 disposed between two pole plates 20 and surrounding with clearance a centrally located core 21. That portion of the tape 10 which advances past the leaf spring 14 is guided along the adjoining edge faces of the lever 16.

When the apparatus is in use, the shaft 13a is driven by the motor so that the roller 13 rotates in a counterclockwise direction as indicated by the arrow. The spring 14 bears against the tape 10 and biases it against the peripheral surface of the roller 13 whereby the roller entrains the tape and advances it lengthwise. When the coil 18 is deenergized the bias of the spring 14 suffices to maintain the shorter arms 16b in the grooves 15. This lifts the coil 18 by a distance of about 1 millimeter above and away from the permanent magnet 19. It will be noted that the shorter arms 16b of the lever 16 are located opposite the leaf spring 14. The recording device 11 at the recording station records information on the tape 10 when its electrodes receive current to destroy certain portions of the metallic layer on the tape.

When the tape 10 is to be held against further lengthwise movement, the circuit of the coil 18 is completed. The resulting magnetic field of the coil 18 cooperates with the field of the permanent magnet 19 in the gap around the core 21 and causes the coil to move downwardly, as viewed in FIG. 1, whereby the lever 16 is pivoted from the idle position shown in FIG. 1 to the operative position of FIG. 2 in which the tips of its shorter arms 16b extend from the respective grooves 15 of the roller 13 and cooperate with the leaf spring 14 to clamp the tape 10 and to thus hold it against further lengthwise movement. At the same time, the tips of the arms 16b reduce the area of contact between the tape 10 and the peripheral surface of the roller 13 so that the roller can continue to rotate without, however, causing lengthwise movement of the tape.

The arresting action of the improved disengaging device is practically instantaneous, even if the tape 10 is being advanced at a relatively high speed in the range of five meters per second or more. The roller 13 can continue to rotate at normal speed without effecting lengthwise displacement of the tape 10 as long as the coil 18 remains energized. However, the tape is moved again as soon as the coil 18 is deenergized, i.e., as soon as the leaf spring 14 is free to return the arms 16b into the respective grooves 15 and biases the tape against the peripheral surface of the roller 13.

FIG. 2 further shows a plate-like frame member 22 which supports the component parts of the improved transporting apparatus. Since the lever 16 is of lightweight design, it reacts practically instantaneously as soon as the coil 18 is energized and also in immediate response to collapse of the magnetic field of the coil to respectively assume its operative and idle positions. The delay with which the tape 10 is started or arrested is in the range of 0.2 millisecond which, at an average speed of tape of 10 meters per second in idle position of the lever 16, results in a braking or accelerating distance of 2 millimeters, i.e., less than one-tenth of an inch. Thus, the tape can be arrested at very high writing speeds between two successive recordings with a delay which is an extremely small fraction of a second and necessitates a braking or accelerating distance which is very satisfactory for operation with recording devices which burn the information into a metallic layer on the tape.

It is necessary to stop the tape with a very short delay in order to be able to register several coherent informations on the tape. Because these informations are fed into the recorder with intervals, the tape has to be stopped immediately after the registration of the last recording of an information. As soon as the next information is fed into the recorder the tape starts again. The standard distance between two recordings of one-tenth of an inch must be exactly maintained between the last recording of the first information and the first recording of the following information, that when scanning the tape the informations may be read continuously.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. Apparatus for intermittently transporting tape, particularly for transporating tape past a recording station which stores intelligence on the tape, comprising a driven roller having a tape-engaging peripheral surface; resilient means engaging one side of the tape to bias the other side of the tape against said peripheral surface so that the tape is normally transported in response to rotation of said roller; and disengaging means comprising a lifting member movable from an idle position to an operative position in which it displaces the tape with reference to said roller to reduce the area of contact between said other side of the tape and said peripheral surface so that the roller can rotate with reference to the tape, said lifting member being arranged to engage in said operative position thereof the tape opposite said resilient means whereby the tape is clamped between said lifting member and said resilient means and is held against lengthwise movement in response to rotation of said roller.

2. Apparatus as defined in claim 1, wherein said roller is provided with at least one circumferential groove in said peripheral surface thereof and said lifting member comprises a portion which is received in said groove in the idle position but extends from said groove to engage the tape in said operative position of said lifting member.

3. Apparatus as defined in claim 2, wherein said lifting member is a two-armed lever turnable about a fixed axis and having a first arm constituting said portion thereof and a second arm, said disengaging means further comprising rocking means cooperating with said second arm to turn said lever between said idle and operative positions.

4. Apparatus as defined in claim 3, wherein said rocking means comprises a moving coil.

5. Apparatus as defined in claim 4, wherein said coil is secured to said second arm and said rocking means further comprises stationary magnet means adjacent to said second arm and arranged to attract said coil in response to energization of said coil.

6. Apparatus as defined in claim 4, wherein said second arm is longer than said first arm.

7. Apparatus as defined in claim 1, wherein said resilient means comprises a leaf spring.

8. Apparatus for intermittently transporting tape, particularly for transporting tape past a recording station which stores intelligence on the tape, comprising a driven roller at least a portion of which consists of elastic material, said driven roller having a tape-engaging peripheral surface provided on said portion of said roller; resilient means engaging one side of the tape to bias the other side of the tape against said peripheral surface so that the tape is normally transported in response to rotation of said roller; means cooperating with said resilient means to loop the tape around said roller along an arc of at least 180 degrees; and disengaging means comprising a lifting member movable from an idle position to an operative position in which it displaces the tape with reference to said roller to reduce the area of contact between said other side of the tape and said peripheral surface so that the roller can rotate with reference to the tape.

References Cited

UNITED STATES PATENTS

| | | | |
|---|---|---|---|
| 2,595,197 | 4/1952 | Kuhlow | 226—176 |
| 3,310,214 | 3/1967 | Nesin | 226—191 X |
| 3,388,844 | 6/1968 | Tamura | 226—180 X |

ALLEN N. KNOWLES, Primary Examiner

U.S. Cl. X.R.

226—191